Dec. 25, 1956  F. A. GREENAWALT  2,775,667
CONTROL APPARATUS
Filed July 21, 1953
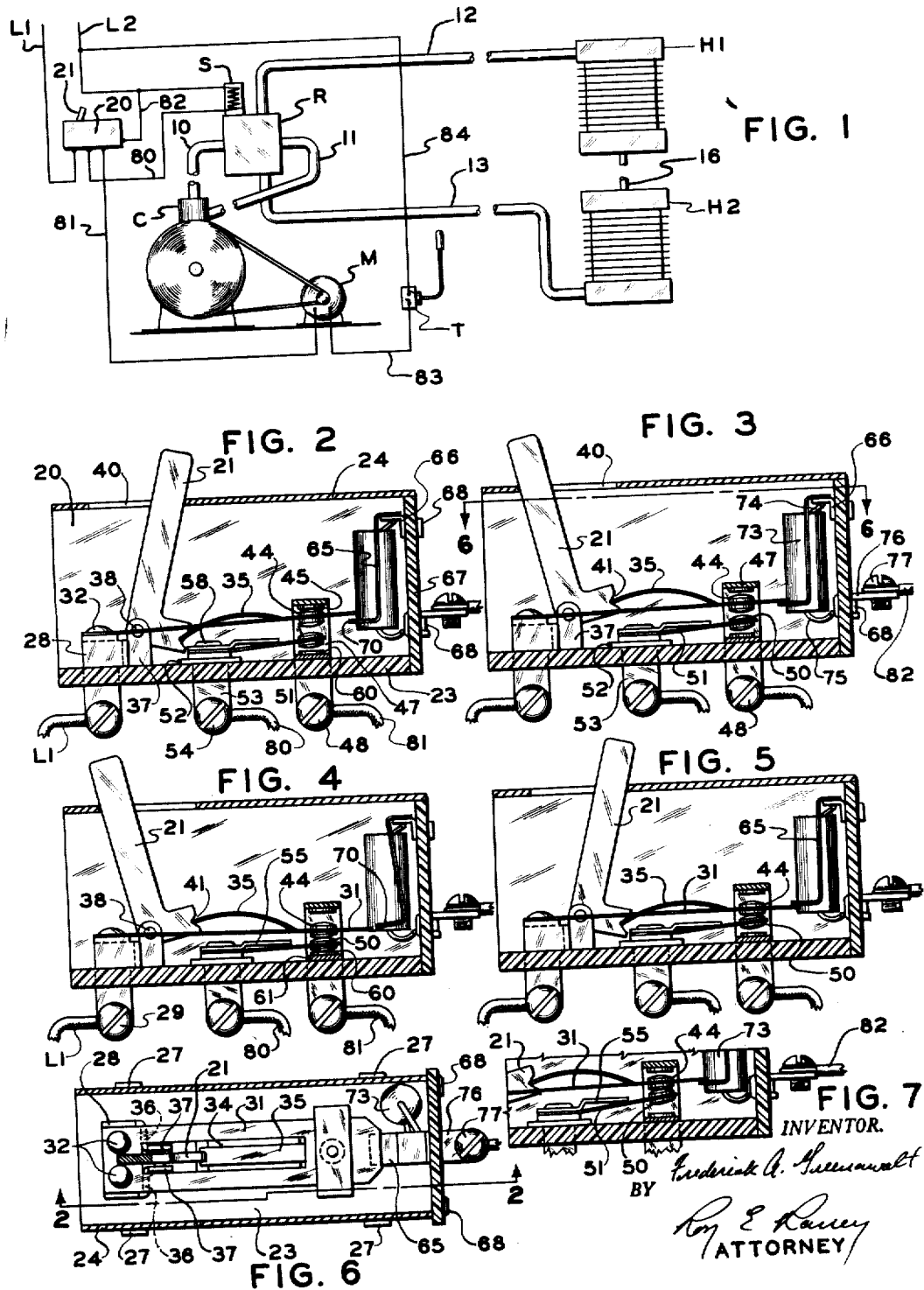
INVENTOR.
Frederick A. Greenawalt
BY
Roy E. Raney
ATTORNEY

United States Patent Office 2,775,667
Patented Dec. 25, 1956

2,775,667

CONTROL APPARATUS

Frederick A. Greenawalt, Columbus, Ohio, assignor to Ranco Incorporated, Columbus, Ohio, a corporation of Ohio Application July 21, 1953, Serial No. 369,427

4 Claims. (Cl. 200—116)

The present invention relates to improvements in an electrically powered refrigerating system of the so-called "reverse cycle" type, having two heat exchangers, one of which serves to cool or heat a room, for example, according to the routing of the refrigerant from the compressor through the exchangers. In some cases it is desirable to control the direction of flow of refrigerant through the heat exchangers by a solenoid actuated valve mechanism operative to reverse the refrigerant flow through the exchangers when the solenoid is energized or deenergized, and the present invention is particularly directed to control mechanism, which may be manually or automatically actuated, to control the solenoid and to render the compressor inoperative for a limited time preceding the reversing operation of the valve mechanism to permit refrigerant pressure within the system to become more or less equalized and thereby prevent excessive loads on the compressor.

An object of the invention is the provision of control apparatus in a refrigerating system of the type referred to, which apparatus includes a control member oscillatable between two limits at which limits the member is operative to permit the compressor to operate and when intermediate the limits prevents operation of the compressor, the member engaging a latch during its movement from the one limit to the other which restrains or interrupts its movement to the other limit, the latch being movable, after a period, to release the control member to permit it to continue its movement to its other limit, and a control element for the solenoid valve adapted to cooperate with the control member when the latter is intermediate its limits and at one limit to energize the valve solenoid while the control member is restrained by the latch, at least in one direction of its movement, and the compressor is inoperative.

A more specific object of the invention is the provision of a control apparatus of the character referred to in which the control member comprises a contact carrying switch arm which is yieldingly oscillatable between limits determined by two fixed spaced contacts adapted to be connected in the compressor circuit, and the control element comprises a contact carrying spring leaf parallel with the control member and having its contact disposed between the contact on the control member and one of the fixed contacts, the contact on the control member adapted to engage the contact on the leaf spring, when the control member moves toward the last mentioned fixed contact, and deflect the spring leaf to move its contact into engagement with the last mentioned fixed contact to thereby establish electrical connection between the control member and the last mentioned fixed contact, and when the control member moves in the opposite direction a circuit is broken through the fixed contact but the contacts on the control member and leaf spring remain engaged until the control member is released by the latch.

Still another object of the invention is the provision of a control apparatus of the character referred to wherein the latch comprises a bimetal strip arranged to extend into the path of the control member when the bimetal is relatively cool and which is heated by an electrical heater, the circuit of which is established when the control member engages the bimetal. The heating of the bimetal causes it to deflect and release the control member for movement to its limit toward which it is biased.

Other objects and advantages of the invention will be apparent from the following description of preferred forms of the invention, reference being made to the accompanying drawings wherein Fig. 1 is a schematic view of a refrigerating or air conditioning system embodying the invention;

Figs. 2, 3, 4 and 5 are sectional views, taken on line 2—2 of Fig. 6, of a control apparatus for the system shown in Fig. 1;

Fig. 6 is a sectional view of the control apparatus shown in Figs. 2 to 5 taken on line 6—6 of Fig. 3; and Fig. 7 is a fragmentary sectional view of another form of control apparatus similar to that shown in Figs. 2 to 5.

Referring to Fig. 1, a refrigerating system is shown which is of the so-called "reverse cycle" type comprising a compressor C, which is driven by an electric motor M, connected with heat exchangers H–1, H–2 through suitable conduits and a reversing valve R. Air is forced over the heat exchanger H–1 and into a room for affecting the room temperature, the air blower and related ducts are not shown since they are well known in the art.

The reversing valve R may be of any suitable type, and includes a solenoid S for actuating the valve mechanism, not shown, to reverse the direction of flow of refrigerant from the compressor through the heat exchangers H–1, H–2 when the solenoid is energized or deenergized. The inlet of the valve R is connected with the outlet of the of the compressor C by a pipe 10 and the outlet of the valve is attached to the intake of the compressor by a pipe 11. One reversing port of the valve R is connected with the heat exchanger H–1 by a pipe 12 and the other reversing port is connected with the heat exchanger H–2 by a pipe 13. The two heat exchangers H–1, H–2 are interconnected by a restrictor or capillary tube 16 to cause the refrigerant flowing from one heat exchanger to the other to enter the other heat exchanger at a reduced pressure and cause expansion of the refrigerant therein with resulting heat absorption, as is well understood in the art. It will be seen that when one heat exchanger serves as a condenser and gives off heat, the other exchanger serves as an evaporator and absorbs heat. It will be understood that the exchanger H–2 could have a heat exchange medium such as water or air directed thereover for most efficient operation.

In the form shown, when the solenoid S is deenergized the valve mechanism is arranged to cause the flow of refrigerant from the compressor through pipe 13 to the heat exchanger H–2 thence through restrictor 16 to heat exchanger H–1 and back to the compressor through the pipes 12 and 11. When the solenoid is energized, refrigerant is caused to flow from the compressor through pipe 12 to H–1, through restrictor 16 to H–2 and through pipes 13, 11 back to the compressor.

The compressor motor M is controlled by a suitable thermostatically operated switch mechanism T operating in accordance with changes in temperature of the space to be heated or cooled.

The solenoid S is controlled by a control switch mechanism 20 which includes a manually operable control member 21 movable between two control positions to actuate the switching mechanism for energizing or deenergizing the solenoid.

Just prior to either the energization or deenergization of the solenoid S, either of which results in a reversal of the flow of refrigerant, it is desirable to terminate for a relatively short period, operation of the compressor to permit the refrigerant pressures in the heat exchangers H-1, H-2 to more or less equalize and thereby minimize Just prior to either the energization or deenergization the load placed upon the compressor. The present invention is directed to switching mechanism for causing the compressor motor to be idle for an appreciable period at the time immediately preceding both the energizing or deenergizing of the solenoid.

In the form of the invention shown, the control 20 comprises a base member 23, which is preferably formed of insulating material, having a sheet metal U-shaped cover 24 attached thereto. The cover 24 has rectangular openings adjacent to the lower edges thereof through which lugs 27, formed integral with the base 23, extend to secure the cover to the base to substantially enclose switching mechanism mounted on the base.

The switching mechanism includes an inverted U-shaped terminal member 28 having the legs thereof secured in openings in the base. One leg is longer than the other and projects below the base and has a terminal screw 29 threaded in an opening therein. The yoke of the member 28 has one end of a spring type contact member 31 attached thereto as by rivets 32.

The contact strip 31 has a center opening 34 formed therein and a tongue 35, formed integrally with the strip, extends longitudinally of the opening inwardly from the free end portion of the strip and forms a bowed over-center spring for urging the free end of the strip in one direction or the other, as is described more fully hereinafter.

The legs of the terminal member 28 each has a projection 36 from one side which is bent inwardly and then at right angles to form two upstanding parallel lugs 37 which extend upwardly through the opening 34 in the strip 31 and which provide bearings for a pin 38 on which the operating member 21 is pivoted.

The operating member 21 is L-shaped with the longer leg thereof projecting upwardly through a slot 40 in the top wall of cover 24. The shorter leg of the member 21 is notched as at 41 and the free end of the tongue 35 is engaged in the notch so that the tongue is held in a bowed condition, as may be seen in Figs. 2, 3. It will be seen that when the member 21 is moved from one end of the slot 40 to the other the free end of the tongue 35 is moved above and below the center line of the contact strip 31 to thereby yieldingly shift the free end of the strip in opposite directions. It will also be noted that the reaction of the tongue 35 on the member 21 causes the member to be yieldingly held against whichever end of the slot 40 it is moved manually.

The contact strip 31 carries a double contact 44 adjacent the free end thereof, the upper surface of which contact is adapted to engage a contact 45 carried on the yoke of an inverted U-shaped terminal member 47. The terminal member 47 has its legs secured in openings in the base 23 and one leg, formed longer than the other, projects below the base and has a terminal screw 48 threaded in an opening therein. The contact 45 being fixed, forms a stop to limit upward movement of the strip 31, as viewed in the drawings.

The lower surface of the double contact 44 is adapted to engage the upper surface of a double contact 50 carried on the end of a leaf spring 51 which is attached to a terminal plate 52 secured to the base member 23. The terminal plate 52 has a leg 53 which projects through the base 23 and has a terminal screw 54 threaded in an opening therein so that the leaf spring 51 can be electrically connected in a circuit.

The spring 51 is normally biased upwardly, as viewed in the drawings, and its upward movement is limited by a relatively rigid arm 55 which is attached to the terminal plate 52 in superimposed relation with the spring 51 and the outer end thereof forms a stop against which the spring abuts. The spring 51 and arm 55 are attached to the terminal plate 52 by rivets 58, only one of which appears in the drawings.

The lower face of the double contact 50 is adapted to engage a fixed contact 60 which is secured to a bar 61 attached to the base 23 and electrically connected with the terminal member 47. When the contact strip 31 is biased downwardly by the spring tongue 35 it is adapted to depress the spring 51 and force contact 50 against contact 60 which thereby limits the downward movement of the strip 31 and establishes electrical circuits described more fully hereinafter.

The free end of the contact strip 31 is adapted to engage a bimetal latch 65 when it is moved from one of its limits toward the other. The latch 65 is secured at one end to a bracket 66 attached to an insulating plate 67, which forms an end wall of the cover for the control apparatus. The wall 67 is notched at its sides to receive lugs 68 formed on the end of the cover 24 which are turned inwardly, as viewed in Fig. 6, to secure the wall in position, against the ends of the base 23 and cover 24. The free end of the bimetal 65 has a foot portion 70 projecting laterally therefrom and it normally projects into the path of the end portion of the strip 31. When the latch 65 is heated above normal ambient temperatures it is adapted to flex to the right and thereby withdraw the foot portion 70 from engagement with the strip 31 to thereby release the strip and free it for movement by the bowed tongue 35. It will be seen from comparing Figs. 3 and 5 that the latch 65 is effective to interrupt or prevent movement of the strip 31 in either direction and to retain the strip in a position intermediate the limits formed by the contacts 45 and 60.

The bimetal latch 65 is adapted to be heated above normal ambient temperatures by a resistance element 73, one terminal wire 74 of which is brazed to the bracket 66 and the other terminal wire 75 of which is brazed to a terminal member 76 having a part projecting through the end wall 67 and having a terminal screw 77 threaded in an opening therein.

The electrical power for the refrigerating system is supplied by lines L1, L2 which are connected with a suitable power source, such as a 115 v. A. C. line, and line L1 is attached to terminal 28 by screw 29. The terminal member 52 is connected with one lead of the solenoid S by a wire 80 secured thereto by the terminal screw 54 whereby one side of the circuit for the solenoid is established through contact strip 31, contacts 44, 50 and contact spring 51. The terminal 47 has a wire 81 connected thereto by the screw 48, which wire leads to one terminal of the motor M whereby the motor circuit includes switch strip 31, contact 44 and either contact 45 or contacts 50, 60, depending upon at which of its limits the contact strip 31 is positioned. The terminal 76 has a wire 82 attached thereto by screw 77, which wire is connected to the line L–2.

The other terminal of the motor M is connected by wire 83 to one terminal of the control thermostat T and the other terminal of the thermostat is connected by wire 84 to L–2. It will be seen that the thermostat T normally controls the operation of the compressor but is superseded by the control 20 when contact strip 31 is moved intermediate its limits formed by contacts 45, 60.

When cooling of the room is desired, for example, the control member 21 is moved to the right as shown in Fig. 2 in which position contact 44 engaged contact 45 thereby establishing one side of the circuit for the compressor motor M so that the compressor will be operated in accordance with the thermostat T to circulate refrigerant through the valve R. Since contact 44 is separated from contact 50 the valve S is deenergized so that the refrigerant is circulated first through the heat exchanger H–2, which serves as a condenser, and thence to the heat exchanger H–1 wherein the refrigerant is evaporated to absorb heat from the air passed thereover.

When it is desired to cause heating in the room, member 21 is moved to the left as shown in Fig. 3 which causes the strip 31 to be urged downwardly so that its free end engages the foot 70 of the latch 65 thereby holding contact 44 in a position spaced from contacts 45 and 50, as is shown in Fig. 3. It will be observed that the circuit for the motor M is now broken and that the circuit for the solenoid S has not yet been established, since contact 44 is prevented from engaging contact 50 by the latch.

A circuit for the resistance 73 is established through contact strip 31, bimetal 65, bracket 66, resistance element 73, terminal 76 and wire 82 to L–2. After the elapse of four to five minutes, depending upon the value of the resistance 73 and the characteristics of the bimetal, the bimetal is heated sufficiently to deflect to the right and release strip 31 for movement to its lower limit as determined by contact 60, which condition is shown in Fig. 4. It is seen that contact 44 engages contact 50 and contact 50 now engages contact 60 whereby the solenoid circuit is completed as well as one side of the compressor motor circuit. The energization of the solenoid causes the valve mechanism R to shift and reverse the flow of refrigerant through the heat exchangers, as explained previously. It will be noted that the release of the strip 31 by the bimetal causes the circuit for the heater 73 to be broken, whereupon the bimetal cools and returns to its latching position within a relatively short time. It will be understood that the thermostat T should be provided with means to reverse its operation to now cause the motor M to operate on a predetermined low temperature and to stop when a higher temperature is attained.

When it is desired to again change the operation of the refrigerating system to cool the air in the room, member 21 is moved to the right which causes strip 31 to be urged upwardly from its limit established by contact 60 and it engages the underside of the foot 70 of the bimetal latch. With the strip 31 engaging the underside of the latch, contact 50 carried by the spring 51 remains in engagement with the contact 44 to maintain the solenoid S energized, while contact 50 is separated from contact 60 so that the motor circuit is broken at contacts 50, 60. The resistance 73 is again energized by engagement of contact strip 31 with the bimetal 65, as explained previously, and upon heating, the bimetal moves to the right to withdraw foot portion 70 from engagement with the free end of the strip which then snaps to its upward limit, interrupting the solenoid circuit by separation of contacts 44, 50 and reestablishing the motor circuit through contacts 44, 45. The circuit for the resistance 73 is broken when strip 31 leaves the latch so that the bimetal cools and returns to its latching position within a relatively short period.

In the form of the invention just described the circuit for the solenoid is not completed until after the contact strip 31 has been released by the latch 65. In some cases it might be desirable to cause the solenoid circuit to be established immediately after the motor circuit is broken at contacts 44, 45. This can be accomplished as shown in Fig. 7 by forming the arm member 55 so that the spring 51 is positioned to cause contact 44 to engage contact 50 when the strip 31 is resting on the top surface of the foot 70 of bimetal latch 65.

It will be seen that the invention provides means by which the motor circuit is temporarily interrupted to assure equalization of the refrigerant pressures prior to reversing of the valve R so that the compressor is not unduly loaded when the function of the refrigerating system is reversed. While the control member 21 is operated manually in the embodiment shown, it or an equivalent member could be operated automatically as by a thermally responsive element.

While but two forms of the invention have been described, other forms, modifications and adaptations could be employed which fall within the scope of the claims which follow.

What is claimed is:

1. A control apparatus comprising in combination, an electrical switch member movable in opposite directions between limits, means to yieldingly urge said member in said opposite directions, electrical contact means actuated by said member when the latter is moved to its limits of movement, latch means engaged by said member during said movements in opposite directions to interrupt movement of said member from either of said limits to the other by the first mentioned means, means to actuate said latch to disengage and release said member for movement by the first mentioned means, a second switch member disposed between the first mentioned switch member and one of said contact means whereby said second switch member cooperates with the first mentioned member and the last mentioned contact means to establish an electrical circuit through said second mentioned switch member, and means to adjust the position of said second switch member relative to the first mentioned member.

2. A control apparatus comprising in combination, a strip spring switch member attached to an electrical terminal member at one end and having its other end flexible in opposite directions, two spaced contacts forming stops to limit said movement of said member, contact means on said member engageable with said two contacts respectively, a bimetal strip attached at one end to an electrical terminal and having the other end disposed to be engaged by said member during said movements in opposite directions to restrain said member from movement to engage either of said two contacts, an electric heater in heat conducting relation to said bimetal and having one end thereof connected to the last mentioned terminal member, said bimetal adapted to move from engagement with said switch member when heated by said heater, said bimetal and switch member forming a part of the circuit for said heater when engaged with one another, an overcenter spring for moving said switch member in said opposite directions, and a manually operable member to shift said spring from one side to the other of its dead center position relative to said switch member.

3. A control apparatus comprising in combination, an electric switch member movable in opposite directions between limits, means to yieldingly urge said member in opposite directions from one limit to the other, electric contact means actuated by said member when the latter is moved to its limits of movement, a latch part normally positioned in the path of movement of said switch member and engaged by said member during said movements between its limits to interrupt movement of said member from either of said limits to the other, and time delay means operative to move said latch part from said path to release said member after a period following engagement of said member with said latch part.

4. A control apparatus comprising in combination, an electric switch member movable in opposite directions between limits, means to yieldingly urge said member in opposite directions from one limit to the other, electric contact means actuated by said member when the latter is moved to its limits of movement, a latch part normally positioned in the path of movement of said switch member and engaged by said member during said movements between its limits to interrupt movement of said member from either of said limits to the other, an electrical thermal motor operative after a period of heating thereof to move said latch part from said path to release said member, and a heating circuit for said electrical thermal motor comprising said switch member and said latch part.

References Cited in the file of this patent

UNITED STATES PATENTS

| Re. 14,842 | Delano | Apr. 20, 1920 |
| 2,069,625 | Rich | Feb. 2, 1937 |
| 2,133,309 | Schmidinger | Oct. 18, 1938 |

(Other references on following page)

UNITED STATES PATENTS

| | | |
|---|---|---|
| 2,170,748 | Eaton | Aug. 22, 1939 |
| 2,367,382 | Taylor | Jan. 16, 1945 |
| 2,385,001 | Jennings | Sept. 18, 1945 |
| 2,387,925 | Mitchell | Oct. 30, 1945 |
| 2,400,984 | Dyer et al. | May 28, 1946 |
| 2,441,885 | Kemler et al. | May 18, 1948 |
| 2,467,797 | Wise | Apr. 19, 1949 |
| 2,610,273 | Judson | Sept. 9, 1952 |
| 2,627,564 | Ericson | Feb. 3, 1953 |
| 2,654,227 | Muffly | Oct. 6, 1953 |
| 2,697,765 | Little | Dec. 21, 1954 |

UNITED STATES PATENT OFFICE
CERTIFICATE OF CORRECTION

Patent No. 2,775,667 December 25, 1956

Frederick A. Greenawalt

It is hereby certified that error appears in the printed specification of the above numbered patent requiring correction and that the said Letters Patent should read as corrected below.

Column 3, line 2, strike out "Just prior to either the energization or deenergization".

Signed and sealed this 22nd day of October 1957.

(SEAL)
Attest:

KARL H. AXLINE
Attesting Officer

ROBERT C. WATSON
Commissioner of Patents